United States Patent
Yamaguchi et al.

(10) Patent No.: US 10,449,498 B2
(45) Date of Patent: Oct. 22, 2019

(54) CONTINUOUS KNEADING DEVICE

(71) Applicant: KOBE STEEL, LTD., Kobe-shi (JP)

(72) Inventors: Kazuo Yamaguchi, Takasago (JP); Yoshinori Kuroda, Takasago (JP); Hideo Funahashi, Takasago (JP); Tsugushi Fukui, Takasago (JP)

(73) Assignee: KOBE STEEL, LTD., Kobe-shi (JP)

( * ) Notice: Subject to any disclaimer, the term of this patent is extended or adjusted under 35 U.S.C. 154(b) by 76 days.

(21) Appl. No.: 15/116,028

(22) PCT Filed: Dec. 22, 2014

(86) PCT No.: PCT/JP2014/083968
§ 371 (c)(1),
(2) Date: Aug. 2, 2016

(87) PCT Pub. No.: WO2015/122105
PCT Pub. Date: Aug. 20, 2015

(65) Prior Publication Data
US 2017/0173543 A1 Jun. 22, 2017

(30) Foreign Application Priority Data
Feb. 13, 2014 (JP) ................................. 2014-025412

(51) Int. Cl.
*B01F 7/08* (2006.01)
*B01F 7/00* (2006.01)
(Continued)

(52) U.S. Cl.
CPC .......... *B01F 7/082* (2013.01); *B01F 7/00891* (2013.01); *B29B 7/483* (2013.01);
(Continued)

(58) Field of Classification Search
CPC ................................. B29C 47/082; B01F 7/082
(Continued)

(56) References Cited

U.S. PATENT DOCUMENTS 4,352,568 A * 10/1982 Lohr ................... B01F 7/105
366/297
4,423,960 A * 1/1984 Anders ................. B29C 47/38
366/75
(Continued)

FOREIGN PATENT DOCUMENTS

CN 101259749 A 9/2008
EP 1 033 217 A2 9/2000
(Continued)

OTHER PUBLICATIONS

Extended European Search Report dated Oct. 17, 2017 in Patent Application No. 14882504.5.
(Continued)

*Primary Examiner* — Tony G Soohoo
*Assistant Examiner* — Elizabeth Insler
(74) *Attorney, Agent, or Firm* — Oblon, McClelland, Maier & Neustadt, L.L.P.

(57) ABSTRACT

A continuous kneading device including a pair of kneading rotors, capable of increasing mesh between the kneading rotors while also suppressing a kneading load applied to the kneading rotors. The continuous kneading device including a barrel and a pair of kneading rotors housed in the barrel. The kneading rotors rotate in mesh in directions different from each other. Each kneading rotor includes a plurality of kneading flights for kneading a material supplied into the barrel. The material is fed axially from the upstream kneading section to the downstream kneading section to be sequentially kneaded. The kneading flight constituting the downstream kneading section has a rotational outer diameter larger than a rotational outer diameter of the kneading flight constituting the upstream kneading section.

5 Claims, 6 Drawing Sheets

(51) Int. Cl.
*B29B 7/48* (2006.01)
*B29C 48/40* (2019.01)
*B29C 48/52* (2019.01)
*B29C 48/54* (2019.01)
*B29C 48/55* (2019.01)
*B29C 48/57* (2019.01)
*B29C 48/25* (2019.01)
*B29C 48/68* (2019.01)

(52) U.S. Cl.
CPC ............ *B29B 7/488* (2013.01); *B29B 7/489* (2013.01); *B29C 48/402* (2019.02); *B29C 48/52* (2019.02); *B29C 48/54* (2019.02); *B29C 48/55* (2019.02); *B29C 48/57* (2019.02); *B01F 2215/0049* (2013.01); *B29C 48/268* (2019.02); *B29C 48/682* (2019.02)

(58) Field of Classification Search
USPC .......................................................... 366/85
See application file for complete search history.

(56) References Cited

U.S. PATENT DOCUMENTS

| | | |
|---|---|---|
| 4,534,652 A | 8/1985 | Stade |
| 5,863,117 A * | 1/1999 | Gheorghita ............. B01F 7/088 366/301 |
| 6,106,142 A * | 8/2000 | Rockstedt ............... B29B 7/482 366/85 |
| 6,211,267 B1 | 4/2001 | Suto et al. |
| 6,280,074 B1 | 8/2001 | Kuroda et al. |
| 7,802,915 B2 * | 9/2010 | Yamada .................. B29B 7/484 366/80 |
| 2002/0185771 A1 | 12/2002 | Tojyo |
| 2008/0181051 A1 | 7/2008 | Yamaguchi et al. |
| 2013/0163373 A1 | 6/2013 | Yamaguchi et al. |

FOREIGN PATENT DOCUMENTS

| | | |
|---|---|---|
| JP | 58-104622 A | 6/1983 |
| JP | 2-12821 U | 1/1990 |
| JP | 10-52818 A | 2/1998 |
| JP | 2000-309017 A | 11/2000 |
| JP | 2002-326219 A | 11/2002 |
| JP | 2012-51363 A | 3/2012 |

OTHER PUBLICATIONS

International Search Report dated Mar. 31, 2015 in PCT/JP2014/083968 filed Dec. 22, 2014.

English translation of the International Preliminary Report on Patentability and Written Opinion dated Aug. 25, 2016 in PCT/JP2014/083968.

* cited by examiner

BACKGROUND ART

CONTINUOUS KNEADING DEVICE

TECHNICAL FIELD

The present invention relates to a continuous kneading device that continuously kneads a material such as resin.

BACKGROUND ART

As a continuous kneading device that continuously kneads a material such as resin, there has been a continuous kneading device disclosed in Patent Literature 1, or the like. The continuous kneading device of Patent Literature 1 includes an internally hollowed barrel and a pair of kneading rotors housed in the barrel. The pair of kneading rotors is disposed so as to make their respective axes be substantially parallel to each other and allowed to rotate in respective directions different from each other. In the continuous kneading device, a material supplied into the barrel is led to between the kneading rotors rotating in the directions different from each other and kneading screws provided in the kneading rotors apply shearing forces to the material to thereby knead the material.

In recent years, it is required to knead a hard-to-knead material, which causes the need for further improvement of a kneading ability of the continuous kneading device. This improvement of the kneading ability can be achieved, for example, by increasing mesh between the kneading rotors. In the case of the continuous kneading device of Patent Literature 1, making the inter-axis distance between respective axes of the pair of kneading rotors be smaller than a rotational outer diameter of kneading flights enables the kneading rotors to be brought into mesh.

Increasing the degree of the mesh of the kneading rotors, however, involves a marked increase in a load (a kneading load) applied to the kneading rotors during the kneading. Specifically, making the kneading rotors be close to each other for increasing the mesh degree causes a large kneading load to be applied in a direction of separating the kneading rotors from each other. The kneading load can adversely affect the kneading rotors or bearing that supports the kneading rotors, or the like.

For the reason, the conventional continuous kneading device cannot allow the mesh between the kneading rotors to be further increased, which brings the difficulty in adapting the continuous kneading device to a kneading resistant material.

CITATION LIST

Patent Literature

Patent Literature 1: Japanese Unexamined Patent Publication No. 2012-051363

SUMMARY OF INVENTION

It is an object of the present invention to provide a continuous kneading device including a pair of kneading rotors, the continuous kneading device being capable of having an increased mesh between the pair of kneading rotors while suppressing a kneading load applied to the kneading rotors and being capable of sufficiently kneading even a hard-to knead material.

Provided is a continuous kneading device including: an internally hollowed barrel; and a pair of kneading rotors housed in the barrel and configured to rotate in mesh in respective directions different from each other, each of the kneading rotors including a plurality of kneading flights for kneading a material supplied into the barrel, the kneading flights being aligned in an axial direction of the kneading rotors. The plurality of kneading flights and portions of the barrel, the portions housing the kneading flights, respectively, constitute a plurality of kneading sections aligned in the axial direction of the kneading rotors, respectively. Each of the kneading rotors has a shape for feeding the material supplied into the barrel in the axial direction from an upstream kneading section of the kneading sections to a downstream kneading section of the kneading sections to thereby cause each of the kneading sections to knead the material sequentially. In each of the kneading rotors, the kneading flight constituting the kneading sections located downstream has a rotational outer diameter $D_2$ larger than a rotational outer diameter $D_1$ of the kneading flights constituting the kneading section located upstream.

DESCRIPTION OF EMBODIMENTS

A continuous kneading device 1 according to an embodiment of the present invention is explained in detail below with reference to the drawings.

Figure 1:
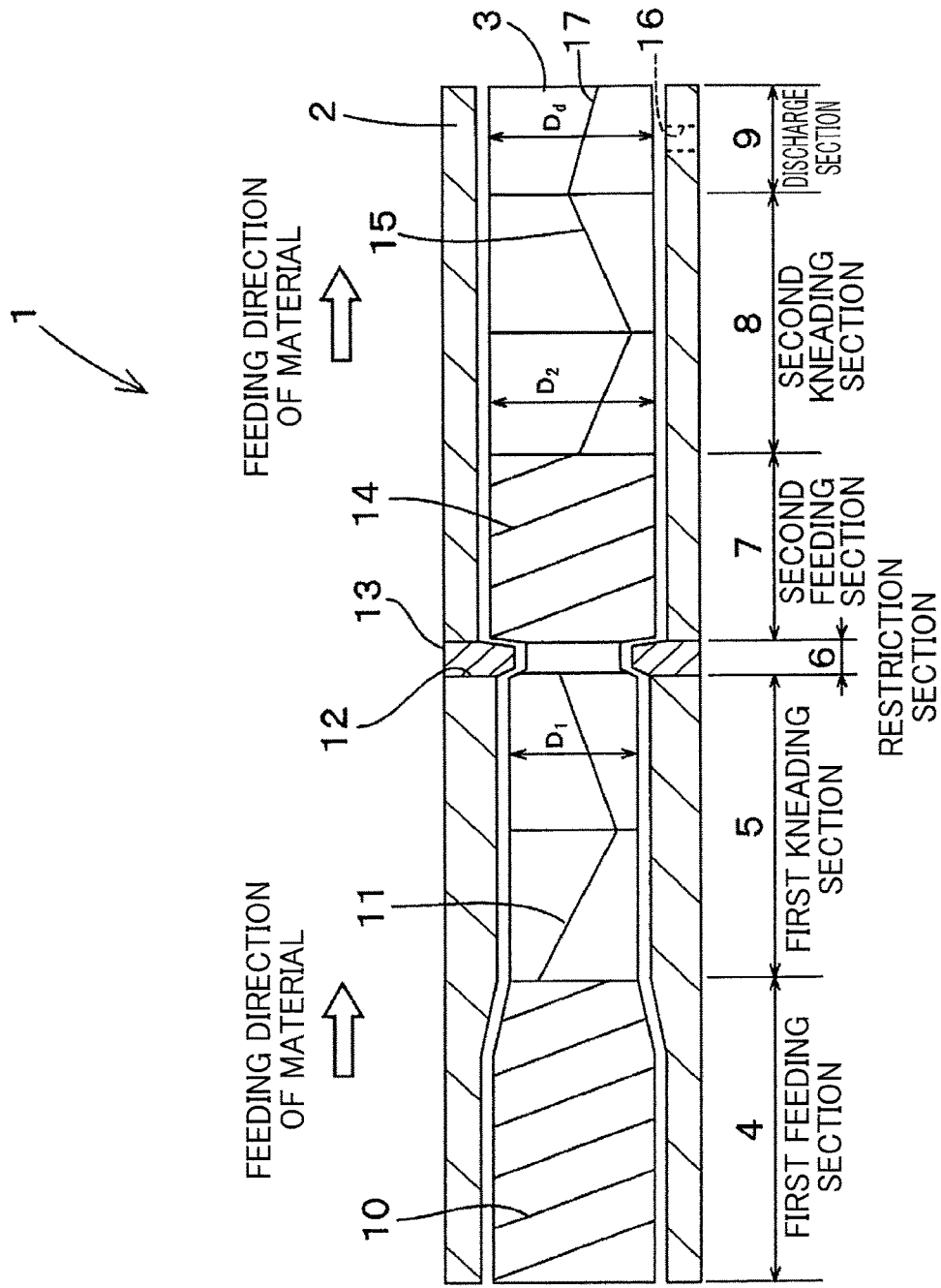
FIG. 1 is a front view of a continuous kneading device according to an embodiment of the present invention.

As shown in FIG. 1, the continuous kneading device 1 according to this embodiment includes a barrel 2 hollowed internally and a pair of kneading rotors 3. The kneading rotors 3 are inserted through the inside of the barrel 2 along the axial direction of the kneading rotors 3. The continuous kneading device 1 further includes a not-shown rotational driving device connected to the pair of kneading rotors 3 to rotate the pair of kneading rotors 3 in respective directions different from each other. Thus rotating the pair of kneading rotors 3 in their directions different from each other in the barrel 2 causes a shearing force to be applied to a material between the pair of kneading rotors 3 and the barrel 2, allowing the material to be kneaded.

Figure 2:
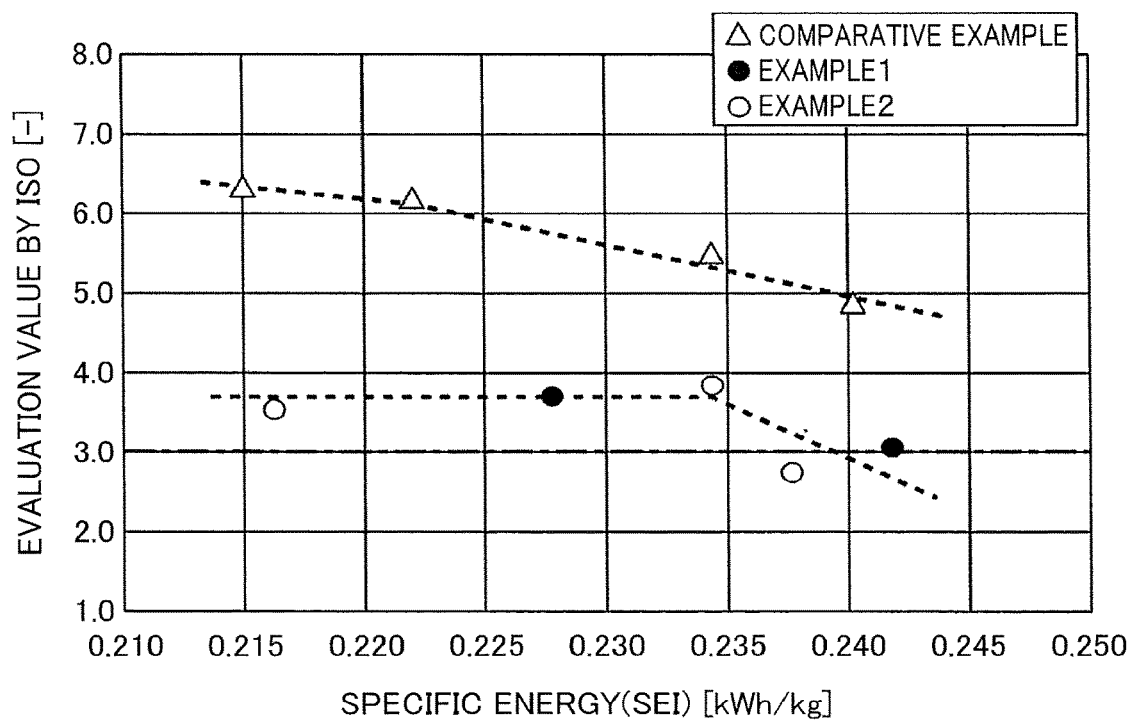
FIG. 2 is a diagram showing changes in evaluation values by an ISO with respect to specific energy in examples of the present invention and a comparative example.

In the following explanation, the left side on a paper surface of FIG. 1 is mentioned as an upstream side and the right side on the paper surface is mentioned as a downstream side, for the explanation of the continuous kneading device 1. The left-right direction on a paper surface of FIG. 2 is mentioned as an axial direction for the explanation of the continuous kneading device 1.

As shown in FIG. 1, the barrel 2 is formed in a cylindrical shape long in an axial direction. The internal cross section of the barrel 2 in a width direction perpendicular to the axial direction is a hollow of an eyeglass shape including two circles arranged side by side in the width direction while overlapping each other (encompassing a shape in which the two circles overlap each other via parts of the circumferences). The pair of kneading rotors 3 are inserted into the inside of the barrel 2 in such respective positions that the respective axes of the kneading rotors 3 substantially coincide with respective centers of the above-mentioned two circles.

The kneading rotors 3, which are long bar-like members extending horizontally, are supported by bearings (not shown in the figure) which are provided in respective positions on both outer sides of both ends in the axial direction of the barrel 2, so as to be rotatable around their respective axes directing horizontally. The kneading rotors 3 are disposed such that the axes of the kneading rotors 3 are parallel to each other. The pair of kneading rotors 3 rotate in their respective rotational directions different from each other. In summary, the kneading rotors 3 are rotationally driven in respective directions different from each other, by the rotational driving device. Specifically, when viewed from the downstream side in the axial direction, the kneading rotor 3 located on the left side rotates clockwise around its axis and the kneading rotor 3 located on the right side rotates counterclockwise around its axis.

The above-mentioned continuous kneading device 1 includes a plurality of portions aligned in the axial direction, namely, six portions in the example shown in FIG. 1: specifically, a first feeding section 4; a first kneading section 5; a restriction section 6; a second feeding section 7; a second kneading section 8; and a discharge section 9 in this order from the upstream side along a flowing direction of a material. The outer circumferential surfaces of portions of the kneading rotors 3, the portions corresponding to the six portions, respectively, are formed with respective flights of types different from one another, that is, flights different from one another in their respective vane shapes or the numbers. These flights of a plurality of types include, for example, a screw flight that form a flow for pushing and moving the material downstream in the barrel 2 and a kneading flight that applies a shearing force to the material to knead the material.

Next will be explained in detail about the first feeding section 4, the first kneading section 5, the restriction section 6, the second feeding section 7, the second kneading section 8, and the discharge section 9.

The first feeding section 4 is a portion for feeding downstream a material supplied into the barrel 2 from a not-graphically-shown material supply port. The material supply port is opened upward to bring the interior and exterior of the barrel 2 into communication with each other, allowing the material to be supplied into the barrel 2 through the material supply port.

The outer circumferential surface of the portion corresponding to the first feeding section 4 in each of the kneading rotors 3 is formed with a screw flights 10 twisted spirally along the axial direction of the kneading rotors 3. The screw flight 10 has a shape capable of feeding the material supplied through the material supply port so as to push and move the material toward the downstream side according to the rotation of the kneading rotors 3. The screw flights 10 and the portion housing the screw flights 10 in the barrel 2 constitute the first feeding section 4. The material fed downstream by the first feeding section 4 is fed to the first kneading section 5 located downstream of the first feeding section 4.

The first kneading section 5 is a section that applies a shearing force to the material in the barrel 2 to knead the material. The outer circumferential surface of the portion corresponding to the first kneading section 5 in each of the kneading rotors 3 is formed with a kneading flight 11. The kneading flight 11 has an outer circumferential surface, which has an outer diameter allowing narrow gaps (chip clearances) to be formed between the outer circumferential surface and the inner circumferential surface of the barrel 2 and between respective outer circumferential surfaces of the kneading rotors 3 adjacent to each other. The material is led to the narrow gaps and the shearing force is applied thereto. Thus, the kneading flights 11 and the portion housing the kneading flights 11 in the barrel 2 constitute the first kneading section 5. The material kneaded by the first kneading section 5 is fed to the restriction section 6 located downstream of the first kneading section 5.

The restriction section 6 is a section located downstream of the first kneading section 5 and configured to restrict circulation of the material between the barrel 2 and the kneading rotors 3 to adjust an amount of the material staying in the first kneading section 5 to be kneaded and thereby adjust the degree of kneading of the material. Specifically, the restriction section 6 includes an opening portion providing a communication between the first kneading section 5 and the second feeding section 7, the opening portion having an inner diameter smaller than the inner diameter of the first kneading section 5 or the second feeding section 7 located forward or rearward of the opening portion and smaller than the inner diameters of the other portions. The portion in the position corresponding to the restriction section 6 in each of the kneading rotors 3 also has an outer diameter smaller than the outer diameters of the other portions of the kneading rotors 3. In the barrel 2, the peripheral wall of the portion corresponding to the restriction section 6 is formed with a through-hole 12 piercing through the peripheral wall of the barrel 2 along the width direction perpendicular to the axes of the kneading rotors 3. In the through-hole 12, received is a tabular gate member 13 capable of blocking circulation of the material along the axial direction so as to be able to enter and exit along the width direction perpendicular to the axial direction.

Thus, in the restriction section 6, switching the position of the gate member 13 in the through-hole 12 to a position where the gate member 13 projects toward the kneading rotors 3 side decreases an area of the channel for the material in the restriction section 6 to thereby decrease circulation speed of the material; this makes the material be likely to stay in the first kneading section 5, thereby allowing the degree of kneading of the material to be increased. Conversely, pulling out the gate member 13 to the outside of the through-hole 12 to switch the position of the gate member 13 to a position where the gate member 13 is far away from the kneading rotors 3 increases the area of the channel for the material in the restriction section 6 to thereby increase the circulation speed of the material. This restrains the material from staying in the first kneading section 5, thereby allowing the degree of kneading of the material to be decreased. The material whose degree of kneading has been thus adjusted to desired one in the restriction section 6 is fed to the second feeding section 7 downstream of the restriction section 6.

The second feeding section 7 is a section that feeds the material kneaded by the first kneading section 5, the degree of the kneading being adjusted by the restriction section 6, to the downstream side. The outer circumferential surface of the portion corresponding to the second feeding section 7 in each of the kneading rotors 3 is also formed with a screw flight 14 twisted in a spiral shape along the axial direction of the kneading rotors 3, similarly to the portion corresponding to the first feeding section 4. The screw flight 14 also has a shape capable of feeding the material while pushing and moving the material toward the downstream side according to rotation of the kneading rotors 3. The screw flights 14 and the portion housing the screw flights 14 in the barrel 2 constitute the second feeding section 7. The material fed to the downstream side by the second feeding section 7 is fed to the second kneading section 8 located downstream of the second feeding section 7.

Similarly to the first kneading section 5, the second kneading section 8 is a section that applies a shearing force to the material in the barrel 2 to knead the material. The outer circumferential surface of the portion corresponding to the second kneading section 8 in each of the kneading rotors 3 is also formed with a kneading flight 15 capable of applying a shearing force to the material in the barrel 2 according to the rotation of the kneading rotors 3. The kneading flights 15 and the portion housing the screw flights 15 in the barrel 2 constitute the second kneading section 8. The material kneaded by the second kneading section 8 is fed to the discharge section 9 located downstream of the second kneading section 8.

The discharge section 9 is a section that discharges a material to the outside of the barrel 2, the material having been kneaded by the first kneading section 5 and the second kneading section 8 explained above. The portion corresponding to the discharge section 9 in the barrel 2 is formed with a discharge hole 16 piercing through the inner wall on the lower side of the barrel 2 configuring the discharge section 9. The outer circumferential surface of the portion corresponding to the discharge section 9 in each of the kneading rotors 3 is formed with a discharge vane 17 having a shape suitable for discharging the material through the discharge hole 16, being capable of discharging the material, which has been kneaded, to the outside of the barrel 2.

Figure 5:
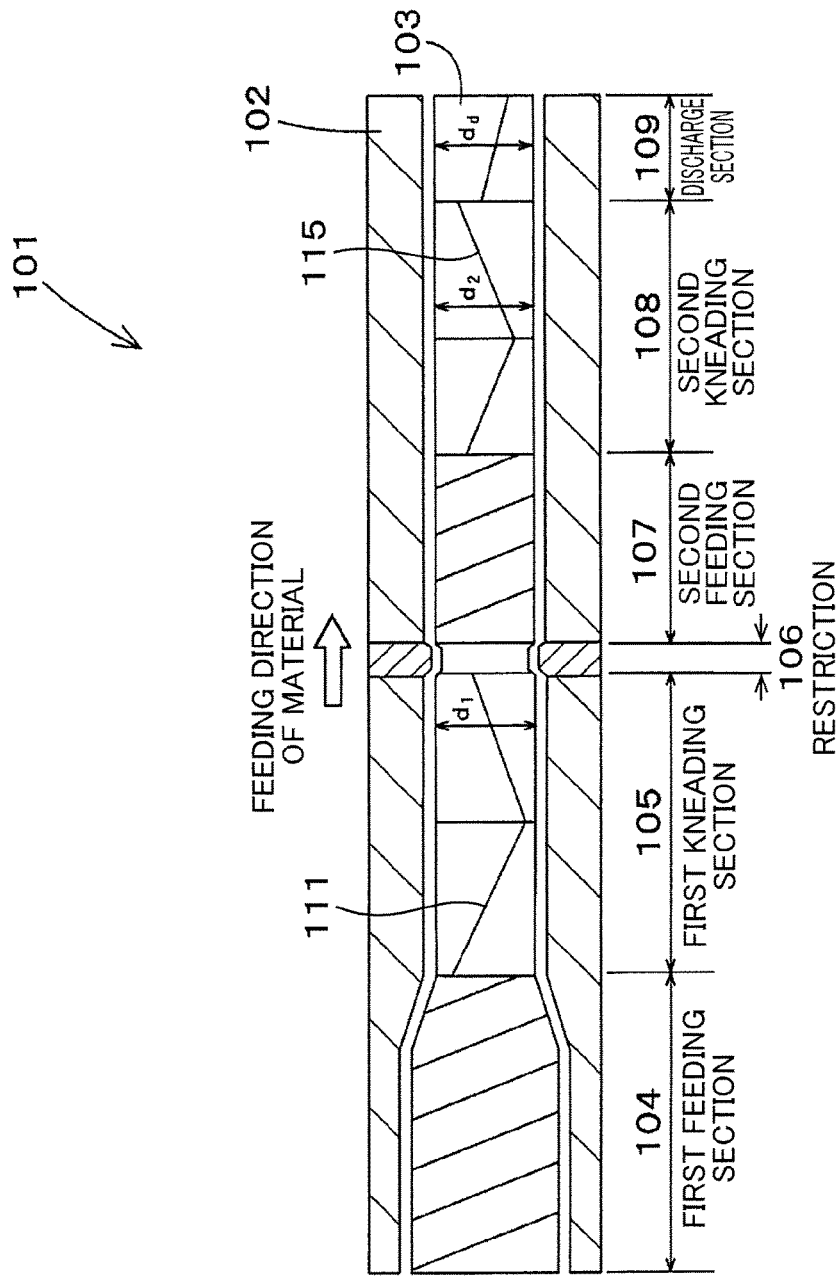
FIG. 5 is a front view of a conventional continuous kneading device.

FIG. 5 shows a continuous kneading device 101 according to a comparative example. The continuous kneading device 101 also includes a barrel 102 and a pair of kneading rotors 103 and the continuous kneading device 101 includes a first feeding section 104, a first kneading section 105, a restriction section 106, a second feeding section 107, a second kneading section 108, and a discharge section 109; however, the barrel 102 is formed such that respective inner diameters of the portions are the same or the inner diameter of a part of the portions decreases toward the downstream side in a feeding direction of a material. Besides, although the kneading rotors 103 has a sectional shape similar to the sectional shape of the barrel 102, the outer diameter of the kneading rotor 103 on "the cross section of the first kneading section 105" and the outer diameter of the kneading rotor 103 on "the cross section of the second kneading section 108" are different from each other.

Specifically, in each the kneading rotor 103, a rotational outer diameter d1 of the portions corresponding to the first kneading section 105, a rotational outer diameter d2 of the portions corresponding to the second kneading section 108, and an outer diameter (a rotational outer diameter of discharge vanes) dd corresponding to the discharge section 109 in the kneading rotors 103 establish a relationship indicated by the following Expression (1).

[Math. 1]

$$d_2 \geq d_2 \geq d_d \quad (1)$$

The continuous kneading device 101 according to the comparative example is a non-mesh type as same as the conventional general continuous kneading facility, wherein the inter-axis distance L' between the pair of kneading rotors 103 is larger than the rotational outer diameter of the kneading rotors 103. Thus, in the continuous kneading device 101, the following Expression (2) holds in addition to Expression (1) described above.

[Math. 2]

$$L' \geq d_1 \geq d_2 \geq d_d \quad (2)$$

However, there is recently increased a need for kneading a hard-to-kneading material, which causes a development of a continuous kneading device having an reduced inter-axis distance between a pair of kneading rotors for further improvement of a kneading ability, in other words, a continuous kneading device of a mesh type. Meanwhile, the reduction in the inter-axis distance involves a marked increase in a kneading load applied to the kneading rotors during kneading, which increases the possibility that such a large kneading load adversely affects the kneading rotors and bearings which support the kneading rotors.

For the reason, in the continuous kneading device 1 shown in FIG. 1, the rotational outer diameter D2 of the kneading flights 15 constituting the second kneading section, which is the kneading section located on the most downstream side in the kneading rotors 3, is set larger than a rotational outer diameter D1 of the kneading flights 11 constituting the first kneading section, which is the kneading section on the most upstream side, as indicated by the following Expression (3).

[Math. 3]

$$D_2 > D_1 \quad (3)$$

Specifically, in the continuous kneading device 1 in this embodiment having the two kneading sections, namely, the first kneading section 5 and the second kneading section 8, "the kneading section located on the most downstream side" is the second kneading section and "the kneading section on the most upstream side" is the first kneading section. Therefore, the feature of the continuous kneading device 1 is that the rotational outer diameter D2 of the kneading flights 15 constituting the second kneading section in the kneading rotors 3 is larger than the rotational outer diameter D1 of the kneading flights 11 constituting the first kneading section. The portion corresponding to the discharge section 9 in each of the kneading rotors 3 has an outer diameter (a rotational outer diameter of discharge vanes) Dd substantially equal to the rotational outer diameter D2 of the second kneading section.

Furthermore, in the continuous kneading device 1, it is desirable that the rotational outer diameter D1 of the kneading flights 11 constituting the first kneading section 5 in the kneading rotors 3 is equal to or smaller than the inter-axis distance L between the pair of kneading rotors 3 and that the rotational outer diameter D2 of the kneading flights 11 constituting the second kneading section 8 is larger than the inter-axis distance L between the pair of kneading rotors 3.

In other words, it is desirable that the continuous kneading device 1 in this embodiment satisfies the following Expression (4).

[Math. 4]

$$D_2 > L \geq D_1 \quad (4)$$

The relationship indicated by the above Expression (4) described above can be considered to indicate also making the rotational outer diameter D1 of the kneading flight 11 each of the kneading rotors 3 be small enough to be equal to or smaller than the inter-axis distance L to bring the kneading flights 11 into non-mesh with each other and making the rotational outer diameter D2 of the kneading flight 15 of each of the respective kneading rotors 3 be larger than the inter-axis distance L to bring the kneading flights 15 into mesh with each other.

Meanwhile, making the rotational outer diameters of the kneading flights 11 and the kneading flights 15 be too small involves a great decrease in kneading ability. Conversely, making the rotational outer diameters of the kneading flights 11 and the kneading flights 15 be too large involves an excessively large kneading load. Hence, it is desirable to set the rotational outer diameter D1 of each of the kneading flights 11, the rotational outer diameter D2 of each of the kneading flights 15, and the inter-axis distance L between the kneading rotors 3 so as to satisfy respective conditions indicated by the following Expression (5) and Expression (6).

[Math. 5]

$$1.1 < D_2/D_1 < 1.3 \quad (5)$$

[Math. 6]

$$0.8 < D_1/L \quad (6)$$

Furthermore, it is more desirable that the relationship between the rotational outer diameter D1 and the inter-axis distance L1 more desirably satisfies the condition indicated by the following Expression (7), in addition to the condition of Expression (6) described above.

[Math. 7]

$$0.9 < D_1/L \quad (7)$$

Satisfaction of Expression (5) and Expression (6), desirably, Expression (5) to Expression (7), makes it possible to improve the kneading ability while suppressing the kneading load, thus enabling the continuous kneading device 1 capable of continuing stable operation while exhibiting a high kneading ability to be provided. Specifically, the continuous kneading device 1 including the kneading rotors 3 each having the rotational outer diameter satisfying the above expressions is the non-meshing type regarding the first kneading section but is the meshing type regarding the second kneading section, thereby having improved kneading ability compared with a device of non-mesh type regarding either of the first and second kneading sections and also having high kneading ability of the entire continuous kneading device 1. On the other hand, the first kneading section, which is most likely to receive the kneading load, is the non-meshing type, thereby allowing the kneading load to be not so large compared with a device of the mesh type regarding both of the kneading sections. This enables the continuous kneading device 1 to establish both of an effect of suppressing the kneading load applied to the kneading rotors 3 and an effect of improving the kneading ability.

EXAMPLES

Next will be explained the action and effects of the continuous kneading device 1 according to the embodiment more specifically in comparison with a comparative example.

In each of Example 1, Example 2, and Comparative example explained below, kneaded is a hard-to-knead material, HDPE (high-density polyethylene resin), by a processing amount of 520 kg/h. The material is kneaded until specific energy which has been applied to the material reach approximately 0.240 kWh/kg. The continuous kneading device according to each of Example 1, Example 2, and Comparative example has, as shown in Table 1, a rotational outer diameter of the kneading rotors 3 ("rotor outer diameter" shown in the table), an inner diameter of the barrel 2 ("chamber inner diameter" shown in the table), an inter-axis distance, and a chip clearance. The rotor outer diameter D11 and the rotor outer diameter D21 shown in Table 1 are equivalent to the rotational outer diameter D1 of each of the kneading flights 11 constituting the first kneading section 5 in the kneading rotors 3. The rotor outer diameter D12 and the rotor outer diameter D22 shown in Table 1 are equivalent to the rotational outer diameter D2 of each of the kneading flights 15 constituting the second kneading section 8 in the kneading rotors 3. Furthermore, the rotor outer diameter Dr1 shown in Table 1 is equivalent to the rotational outer diameter d1 of each of the kneading flights 111 constituting the first kneading section 105 in the kneading rotors 103. The rotor outer diameter Dr2 shown in Table 1 is equivalent to the rotational outer diameter D2 of each of the kneading flights 115 constituting the second kneading section 108 in the kneading rotor 103.

TABLE 1

|  | First kneading section | Second kneading section |
| --- | --- | --- |
| (a) Example 1 | | |
| Inter-axis Distance L | 100 mm | 100 mm |
| Chamber inner diameter | 100.0 mm | 126.9 mm |
| $\phi_{11}/\phi_{12}$ | | |
| Rotor outer diameter | 93.5 mm | 120.4 mm |
| $D_{11}/D_{12}$ | | |
| Chip clearance | 3.2 mm | 3.2 mm |
| (b) Example 2 | | |
| Inter-axis Distance L | 100 mm | 100 mm |
| Chamber inner diameter | 107.4 mm | 126.9 mm |
| $\phi_{21}/\phi_{22}$ | | |
| Rotor outer diameter | 100.9 mm | 120.4 mm |
| $D_{21}/D_{22}$ | | |
| Chip clearance | 3.2 mm | 3.2 mm |
| (c) Comparative example | | |
| Inter-axis Distance L | 100 mm | 100 mm |
| Chamber inner diameter | 100 mm | 100 mm |
| $\phi_{r1}/\phi_{r2}$ | | |
| Rotor outer diameter | 93.5 mm | 93.5 mm |
| $D_{r1}/D_{r2}$ | | |
| Chip clearance | 3.2 mm | 3.2 mm |

As shown in Table 1, in Example 1, the rotational outer diameter D11 of each of the kneading flights 11 constituting first kneading section is 93.5 mm, being smaller than the inter-axis distance L of 100 m. Besides, the rotational outer diameter D12 of each of the kneading flights 15 constituting the second kneading section is 120.4 mm, being larger than each of the inter-axis distance L of 100 mm and the rotational outer diameter D11 of 93.5 mm. Example 1, therefore, satisfies all of the relationships indicated by Expression (3) and Expression (4) described above.

In Example 2, the rotational outer diameter D21 of each of the kneading flights 11 constituting first kneading section is 100.9 mm, being substantially equal to the inter-axis distance L of 100 mm. Besides, the rotational outer diameter D22 of each of the kneading flights 15 constituting the second kneading section is 120.4 mm, similarly to the rotational outer diameter D12, being larger than each of the inter-axis distance L of 108 mm and the rotational outer diameter D21. Example 2, therefore, satisfies all of the relationships of Expression (3) and Expression (4) described above.

On the other hand, in Comparative example, each of the first and second kneading sections is a non-mesh type. Specifically, in Comparative example, the rotational outer diameter Dr1 of each of the kneading flights 111 constituting the first kneading section is 93.5 mm, being smaller than the inter-axis distance L of 100 mm. The rotational outer diameter Dr2 of the kneading flight 115 constituting the second kneading section is 93.5 mm, being smaller than the inter-axis distance L of 100 mm. Thus, Comparative example satisfies neither of Expression (3) and Expression (4) described above.

There are performed kneading the material of HDPE by use of the kneading rotors 3 (103) according to the examples and the comparative example having the rotational outer diameters shown in Table 1, measuring a state of occurrence of gel in the material after the kneading, and comparing the kneading performances of the kneading rotors 3 (103). For evaluation of the kneading performances, used are an ISO (ISO11420: an evaluation method enacted in 1996) and a WSA (a gel area ratio) for evaluating a state of occurrence of gel in a material were used.

The ISO (ISO11420) is a provision as to a method of evaluating a dispersion degree of carbon black in a polyolefin pipe, a joint, and compound, usually explaining carbon black particles, a size of an aggregate, and a procedure for evaluation of dispersibility in a polyolefin pipe, a joint, and compound containing carbon black of 3% or less.

The WSA is an index representing a ratio of an area of gel in a predetermined observation visual field area (1495 µm×1128 µm), on the basis of check of gel existing on a material surface after kneading, by use of a microscope. The WSA indicates a ratio of an existing gel portion not including carbon, for example, in the case of mixing carbon in a material and kneading the material. Measurement results of the ISO and the WAS are shown in FIG. 2 and FIG. 3.

Figure 3:
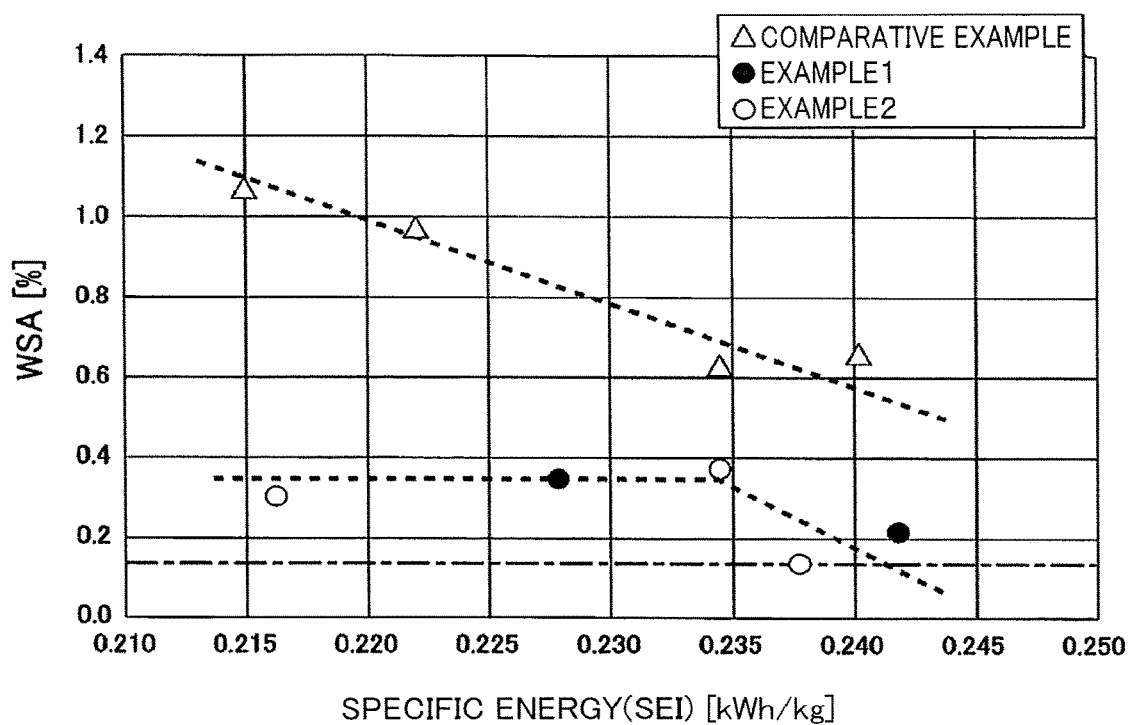
FIG. 3 is a diagram showing changes in gel area ratios with respect to specific energy in the examples of the present invention and the comparative example.

Focusing on a change in Comparative example (a legend of a white triangle) in FIG. 2 and FIG. 3 teaches that the evaluation value by the ISO and the WSA decrease with increase in specific energy applied to the material, and the gel in the material is reduced with progress of the kneading. However, in Comparative example, even when the kneading is performed until the specific energy reaches approximately 0.240 kWh/kg, the evaluation value by the ISO and the WSA are reduced a little, the degree of the reduction being markedly low compared with Example 1 and Example 2.

Furthermore, focusing on changes in Example 1 (a legend of a black circle) and Example 2 (a legend of a white circle) teaches that the evaluation value by the ISO and the WSA remain small irrespective of a change in the specific energy applied to the material. This indicates that each of the devices according to Examples 1 and 2 exhibits a large kneading ability from a point in time immediately after a kneading start and is able to perform the kneading until the gel almost disappears. Therefore, satisfaction of all of the relationships of Expression (3) and Expression (4) described above as in Example 1 and Example 2 allows the existence of excellent effect of greatly improving the kneading ability to be admitted.

Figure 4:
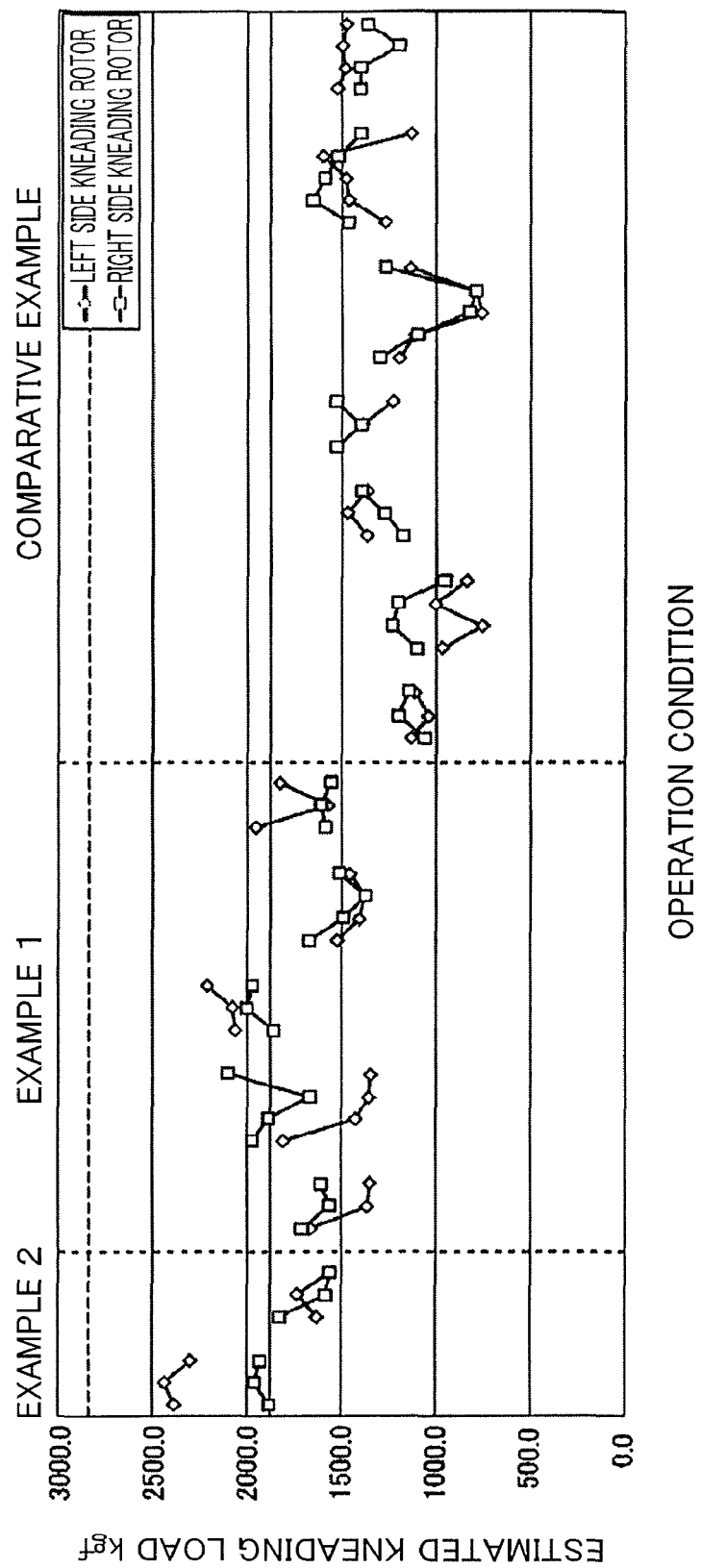
FIG. 4 is a diagram showing kneading loads applied to kneading rotors in the examples of the present invention and the comparative example.

On the other hand, FIG. 4 shows results of measuring kneading loads applied to the kneading rotors 3 in the examples and the comparative example, under various operation conditions. The result as to Comparative example shown in FIG. 4 indicates the kneading load applied to the kneading rotors 103 in Comparative example set in non-mesh. The kneading load applied to the kneading rotors 103 is 700 kgf to 1700 kgf, being smaller than 3000 kgf which is a design upper limit of a load capacity applied to the kneading rotors 103.

However, in the mesh state where the kneading rotors 3 are so close to each other that the rotational outer diameter D1 and the rotational outer diameter D2 exceed the inter-axis distance L, the value of the kneading load is approximately doubled or tripled, thus exceeding 3000 kgf which is the design upper limit of the load capacity; this disables the possibility of breakage in the kneading rotors 3 or breakage in the bearings supporting the kneading rotors 3 from being out of consideration.

As opposed to the comparative example, in Example 1 and Example 2 that satisfy Expression (3) and Expression (4) explained above, the kneading load applied to the kneading rotors 3 is within range of 1300 kgf to 2500 kgf, not exceeding 3000 kgf which is the design upper limit of the load capacity, in spite of the mesh of the kneading rotors 3. This teaches that, in the case of the satisfaction of all of the relationships indicated by Expression (3) and Expression (4) described above as Example 1 and Example 2, the excellent effect of suppression of the kneading load in addition to the improvement of the kneading ability can be achieved.

As described above, regarding the kneading rotors 3 in the continuous kneading device 1, setting the rotational outer diameter D2 of each of the kneading flights 15 constituting the kneading section located on the downstream side to be larger than the rotational outer diameter D1 of each of the kneading flights 11 constituting the kneading section on the upstream side allows the degree of the mesh between the kneading rotors 3 to be large while suppressing a kneading load applied to the kneading rotors 3, thus enabling even a hard-to-kneading material to be sufficiently kneaded.

It should be understood that the embodiment disclosed herein is illustrative in all aspects and is not limiting. In particular, matters not explicitly disclosed in the embodiment disclosed herein, for example, operation conditions and work conditions, various parameters, dimension, weights, and volumes of components, and the like do not deviate from ranges of normal implementation of those skilled in the art. Values that can be easily assumed by those having ordinary skills in the art are adopted.

For example, while the rotational outer diameter D1 of each of the kneading flights constituting the kneading section on the most upstream side among the plurality of kneading sections aligned along the axial direction and the rotational outer diameter D2 of each of the kneading flights constituting the kneading section located on the most downstream side, in the above-described embodiment, satisfy Expression (3) to Expression (7), the continuous kneading device of the present invention is not limited to only the continuous kneading device in which above-described Expression (3) to Expression (7) hold between the kneading flights constituting the kneading section on the most upstream side and the kneading flights constituting the kneading section on the most downstream side. The continuous kneading device of the present invention can be considered to encompass also a continuous kneading device in which the relations of Expression (3) to Expression (7) hold between kneading flights constituting kneading sections relatively located on the upstream side and the downstream side, respectively, even if the kneading sections are other than the kneading section on the most upstream side and the most downstream side.

As explained above, provided is a continuous kneading device including a pair of kneading rotors, the continuous kneading device being capable of having an increased mesh between the pair of kneading rotors while suppressing a kneading load applied to the kneading rotors and being capable of sufficiently kneading even a hard-to knead material. The continuous kneading device includes: an internally hollowed barrel; and a pair of kneading rotors housed in the barrel and configured to rotate in mesh in respective directions different from each other, each of the kneading rotors including a plurality of kneading flights for kneading a material supplied into the barrel, the kneading flights being aligned in an axial direction of the kneading rotors. The plurality of kneading flights and portions of the barrel, the portions housing the kneading flights, respectively, constitute a plurality of kneading sections aligned in the axial direction of the kneading rotors, respectively. Each of the kneading rotors has a shape for feeding the material supplied into the barrel in the axial direction from an upstream kneading section of the kneading sections to a downstream kneading section of the kneading sections to thereby cause each of the kneading sections to knead the material sequentially. In each of the kneading rotors, the kneading flight constituting the kneading sections located downstream has a rotational outer diameter D2 larger than a rotational outer diameter D1 of the kneading flights constituting the kneading section located upstream.

The continuous kneading device is capable of sufficiently knead even a hard-to-kneading material by increasing the rotational outer diameter D2 of each of the kneading flights constituting the kneading section located downstream to increase the mesh between the kneading sections downstream while suppressing a kneading load applied to the kneading rotors by decreasing the rotational outer diameter D1 of each of the kneading flights constituting the kneading section located upstream.

It is preferable that: the plurality of kneading sections include a first kneading section and a second kneading section spaced in the axial direction of the kneading rotors; the pair of kneading rotors is disposed such that respective axes of the kneading rotors are parallel to each other; the kneading flight constituting the first kneading section among the kneading flights of each of the kneading rotors has the rotational outer diameter D1 smaller than an inter-axis distance L between the pair of kneading rotors; and the kneading flight constituting the second kneading section among the kneading flights of each of the kneading rotors has the rotational outer diameter D2 larger than the inter-axis distance L between the pair of kneading rotors. The first kneading section having the rotational outer diameter D1 smaller than the inter-axis distance L as explained above separate from each other without mesh to thereby contribute to the suppressed kneading load. On the other hand, the second kneading section having the rotational outer diameter D2 larger than the inter-axis distance L mesh with each other to thereby contribute to improvement of the kneading ability.

More specifically, it is preferable that the first kneading section including the kneading flights each having the rotational outer diameter D1 among the plurality of kneading sections is disposed on a most upstream side and the second kneading section including the kneading flights each having the rotational outer diameter D2 is disposed on a most downstream side.

Figure 6:
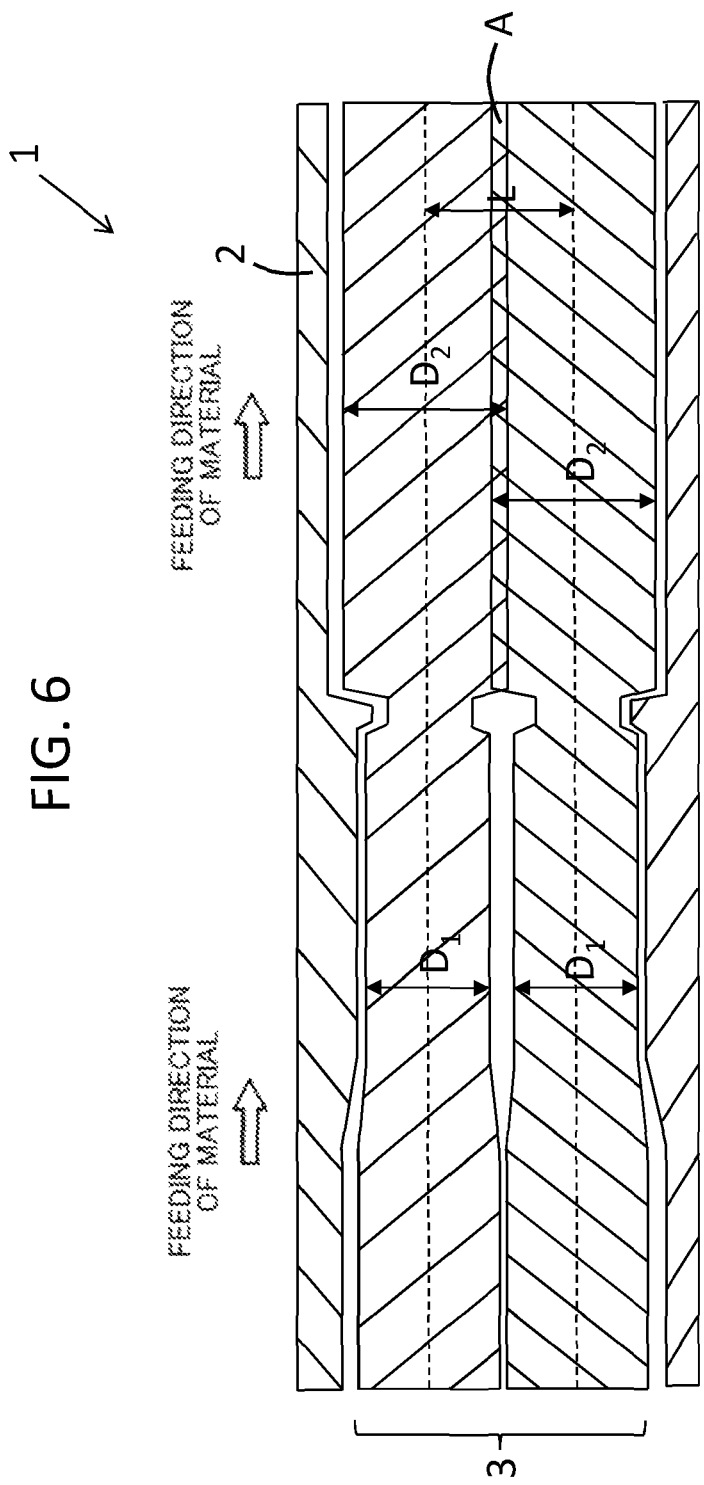
FIG. 6 is a top view of a continuous kneading device according to an embodiment of the present application.

FIG. 6 shows a top view of a continuous kneading device 1 according to an embodiment of the present invention. The continuous kneading device 1 includes a pair of kneading rotors 3, e.g., the kneading rotors 3 of FIG. 1, that are disposed with their axes in parallel to each other. The pair of kneading rotors 3 rotate in different directions from each other. The continuous kneading device 1 further includes a barrel 2 in which the pair of kneading rotors 3 are inserted. The pair of kneading rotors 3 are disposed, as described by the relationship indicated by the above Expression (4). The rotational outer diameter D1 of the kneading flight 11, the rotational outer diameter D2 of the kneading flight 15, and the inter-axis distance L are further indicated in FIG. 6. The cross hatched section A indicates the in mesh portion of the kneading rotors 3.

The invention claimed is:

1. A continuous kneading device comprising:
an internally hollowed barrel;
a pair of kneading rotors housed in the barrel and configured to rotate in respective directions different from each other, each of the kneading rotors including a plurality of kneading flights for kneading a material supplied into the barrel, the kneading flights being aligned in an axial direction of the kneading rotors;
the plurality of kneading flights and portions of the barrel, the portions housing the kneading flights, respectively, constitute a plurality of kneading sections aligned in an axial direction of the kneading rotors, respectively, and each of the kneading rotors has a shape for feeding the material supplied into the barrel in the axial direction from a first kneading section of the kneading sections that is upstream from a second kneading section of the kneading sections to thereby cause each of the kneading sections to knead the material sequentially;
in the pair of the kneading rotors, the kneading flight constituting the second kneading section has a second rotational outer diameter larger than a first rotational outer diameter of the kneading flights constituting the first kneading section;
in the pair of the kneading rotors, the second rotational outer diameter of the kneading flight constituting the second kneading section is larger than an inter-axis distance between the pair of kneading rotors to cause the kneading flight constituting the second kneading section of each of the kneading rotors to rotate in mesh in respective directions different from each other;
a feeding section between the first kneading section and the second kneading section; and
a restriction section between the feeding section and the first kneading section, wherein
the restriction section includes an opening portion providing a communication between the feeding section and the first kneading section, the opening portion having an inner diameter smaller than an inner diameter of each of the first kneading section, the feeding section, and the second kneading section, to restrict circulation of the material between the barrel and the kneading rotors, to restrict circulation of the material from the first kneading section to the second kneading section through the feeding section, and to adjust a kneading degree of the material;
the feeding section is configured to feed the material kneaded by the first kneading section, the degree of the kneading being adjusted by the restriction section, to the second kneading section; and
the second kneading section is configured to knead the material that is supplied from the first kneading section through the restriction section and the feeding section, the degree of the kneading of the material supplied to the second kneading section being adjusted by the restriction section.

2. The continuous kneading device according to claim 1, wherein:
- the first kneading section and the second kneading section are spaced in the axial direction of the kneading rotors;
- the pair of kneading rotors is disposed such that respective axes of the kneading rotors are parallel to each other; and
- the first rotational outer diameter of the kneading flight constituting the first kneading section among the kneading flights of each of the kneading rotors is smaller than the inter-axis distance between the pair of kneading rotors to cause the kneading flight constituting the first kneading section of each of the kneading rotors to rotate in non-mesh in respective directions different from each other.

3. The continuous kneading device according to claim 2, wherein the first kneading section including the kneading flights each having the first rotational outer diameter among the plurality of kneading sections is disposed in a first section of the continuous kneading device that is adjacent to a kneaded material feeding section at an entrance of the barrel, and the second kneading section including the kneading flights each having the second rotational outer diameter is disposed in a second section of the continuous kneading device that is adjacent to a kneaded material exit of the barrel.

4. The continuous kneading device according to claim 1, wherein the kneading flights of the pair of kneading rotors are in mesh in the second kneading section and are non-meshed in the first kneading section.

5. A continuous kneading device comprising:
- an internally hollowed barrel;
- a pair of kneading rotors housed in the barrel and configured to rotate in respective directions different from each other, each of the kneading rotors including a plurality of kneading flights for kneading a material supplied into the barrel, the kneading flights being aligned in an axial direction of the kneading rotors;
- the plurality of kneading flights and portions of the barrel, the portions housing the kneading flights, respectively, constitute a plurality of kneading sections aligned in an axial direction of the kneading rotors, respectively, and each of the kneading rotors has a shape for feeding the material supplied into the barrel in the axial direction from a first kneading section of the kneading sections that is upstream from a second kneading section of the kneading sections to thereby cause each of the kneading sections to knead the material sequentially,
- wherein the kneading flights of the pair of kneading rotors are in mesh in the second kneading section and are non-meshed in the first kneading section, and the pair of in mesh kneading rotors in the second kneading section shears the material based on the different direction of rotation of each of the kneading rotors;
- in the pair of the kneading rotors, the kneading flight constituting the second kneading section has a second rotational outer diameter larger than a first rotational outer diameter of the kneading flights constituting the first kneading section;
- in the pair of the kneading rotors, the second rotational outer diameter of the kneading flight constituting the second kneading section is larger than an inter-axis distance between the pair of kneading rotors to cause the kneading flight constituting the second kneading section of each of the kneading rotors to rotate in mesh in respective directions different from each other;
- a feeding section between the first kneading section and the second kneading section; and
- a restriction section between the feeding section and the first kneading section, wherein
- the restriction section includes an opening portion providing a communication between the feeding section and the first kneading section, the opening portion having an inner diameter smaller than an inner diameter of each of the first kneading section, the feeding section, and the second kneading section, to restrict circulation of the material between the barrel and the kneading rotors, to restrict circulation of the material from the first kneading section to the second kneading section through the feeding section, and to adjust a kneading degree of the material;
- the feeding section is configured to feed the material kneaded by the first kneading section, the degree of the kneading being adjusted by the restriction section, to the second kneading section; and
- the second kneading section is configured to knead the material that is supplied from the first kneading section through the restriction section and the feeding section, the degree of the kneading of the material supplied to the second kneading section being adjusted by the restriction section.

* * * * *